Oct. 23, 1951 E. F. WATSON 2,572,685
TAPE FEED SUPPRESSION MECHANISM
Filed May 13, 1946
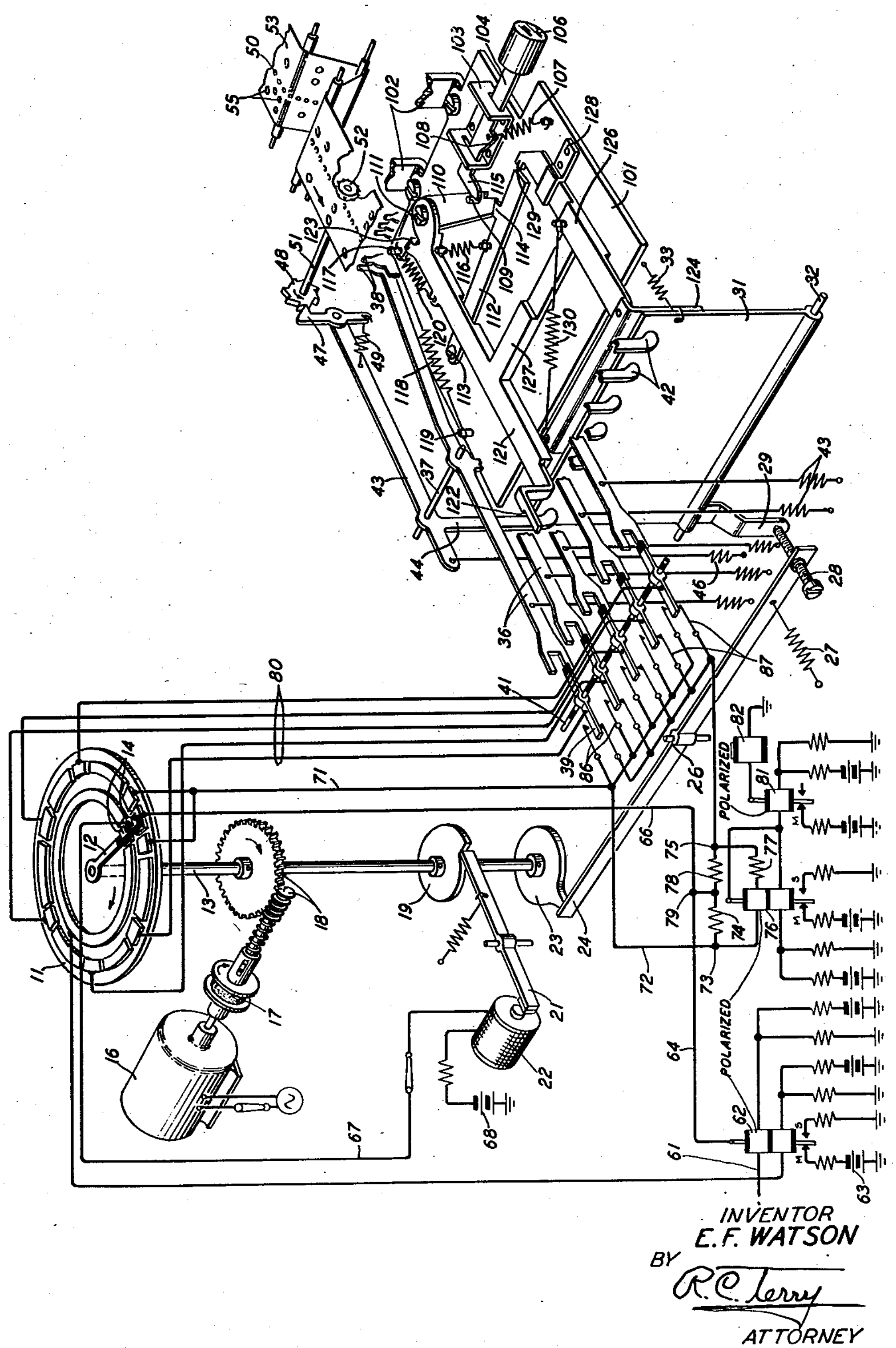
INVENTOR
E. F. WATSON
BY
R. C. Terry
ATTORNEY Patented Oct. 23, 1951 2,572,685

UNITED STATES PATENT OFFICE 2,572,685

TAPE FEED SUPPRESSION MECHANISM

Edward F. Watson, Larchmont, N. Y., assignor to Bell Telephone Laboratories, Incorporated, New York, N. Y., a corporation of New York Application May 13, 1946, Serial No. 669,212

4 Claims. (Cl. 178—22)

This invention relates to telegraph systems and apparatus and particularly to cryptographic or cipher systems.

More specifically the invention relates to printing telegraph systems of the permutation code species wherein secrecy is achieved by altering the character of message signals at the transmitting station by means of cipher key signals in a predetermined or random sequence and by restoring the message signals at the receiving station by an identical sequence of cipher code signals.

An object of the invention is to rephase the sequence of cipher or key code signals at a receiving station with incoming enciphered signals when an out-of-phase condition occurs.

Another object of the invention is to rephase the cipher key sequence of signals with incoming signals at a receiving station without suspension of transmission from the transmitting station.

Another object of the invention is to rephase with incoming signals the key tape of a tape-controlled transmitter-distributor without interfering with the operation of the distributor.

Another object of the invention is to suppress the feeding of tape in a tape transmitter-distributor for one cycle of operation of the distributor.

The invention features a manually operable attachment for tape transmitter-distributors which, upon being operated, will suppress advancement of the tape for one cycle of the distributor.

The invention also features a non-repeat arrangement whereby the feeding of tape will be suppressed for only one cycle of operation of the distributor regardless of how long the manually operable control element is held operated.

In Patent No. 2,405,569 granted August 13, 1946 to K. E. Fitch and G. A. Locke, there is disclosed a printing telegraph system employing start-stop permutation code signals for message transmission and achieving secrecy by encipherment of the message signals. For the purpose of enciphering the signals there is employed a tape controlled cipher signal generator having a sequence of enciphering permutation code signals in the control tape. The enciphering transmitter is operable in start-stop cycles, one cycle for each message signal combination, and the cipher tape is advanced one step for each cycle of the cipher signal generator. The enciphering signal generator is set in operation in response to the start impulse of the message signal code combination and generates the impulses of the enciphering code, impulse by impulse concurrently with the impulses of the message code signal. Depending upon the comparative characteristics of concurrently generated message and enciphering code impulses, code combinations are produced by interaction of the message and cipher code impulses which differ from both of the interacting code combinations, and resulting code combinations are transmitted.

At the receiving station the start impulse of each received code combination sets in operation a similar cipher signal generator having a controlling cipher key tape containing the same sequence of code combinations as the cipher key tape in the enciphering transmitter. The cipher signal generator at the receiving station is set in operation for one cycle in response to the start impulse of each received signal combination and generates impulses which interact impulse by impulse with those of the received code combination. If the cipher code combination which interacts with the received code combination is the same as that which was caused to interact with the message code combination at the transmitting station, the effect of the enciphering operation will be cancelled, the message code signal will be derived and upon being impressed upon a teletypewriter printer, will cause the printing of the character or the performance of the function represented by the message code combination as initially generated at the transmitting station. In the event that there occurs at the receiving station an out-of-step relation of the codes in the cipher key tape to the incoming enciphered signals so that different codes are generated for deciphering than were generated for enciphering, the message signals will not be correctly derived as a result of the interaction of the received impulses and the cipher key impulses, and loss of the message will ensue until the cipher key tape at the receiving station has been correctly rephased with the incoming signals.

Because of the fact that the cipher signal generator at the receiving station is set in operation for a single cycle in response to the start impulse of received signals, it has been found that hits or line surges, in the case of transmission over telegraph lines, and static bursts, in the case of transmission over radio telegraph channels, may simulate the start impulses of signal combinations and cause receiving relays to respond at improper times, as if to start impulses, thereby causing the key code signal generator at the receiving station to operate in one or more cycles while such simulated start impulse condition endures, and accordingly to advance the cipher key tape a like number of steps. If there has been no transmission from the transmitting station at the time that one or more cycles of the deciphering signal generator are caused by the disturbance which simulated a start impulse, the key tape at the receiving station will be a corresponding number of steps ahead of the key tape at the transmitting station and signals thereafter received from the transmitting station will not be correctly deciphered.

Heretofore the practice has been, when the receiving apparatus ceased to print intelligible copy and it was apparent that the cause of the failure was the occurrence of an out-of-phase condition of the cipher tape at the receiving station relative to incoming signals ciphered at the transmitting station, to notify the transmitting station to cease transmitting, as by the transmission of a break signal, to intercommunicate with the transmitting station for the purpose of agreeing on like starting points in the cipher tapes, and to request the transmitting station to retransmit as much of the message as had been received in unintelligible form. This procedure is wasteful of time and is particularly annoying in conference types of intercommunication in which information is interchanged telegraphically in much the same manner as in telephone conversations.

In the majority of occurrences of out-of-phase conditions due to causes hereinbefore set forth, the magnitude of the out-of-phase condition is of the order of a step or two and the cipher tape at the receiving station is ahead of the cipher tape at the transmitting station. Correction may be effected by suppressing feeding of the cipher tape at the receiving station while the distributor of the cipher signal generator at the receiving station operates in response to the reception of ciphered signals from the transmitting station. Since it would be undesirable to overcorrect for out-of-phase conditions, it is preferable to provide for single step correction which may be repeated if it is found that one step is insufficient. To provide for single step tape feed suppression, the present invention includes a manually operable member which, upon being operated, prepares a lever to be presented in blocking relation to the tape feed lever of the transmitter. In the tape transmitter-distributor to which the invention has been adapted tape feeding is effected by a pawl and ratchet mechanism, the tape feeding operation is positive and the return stroke of the tape feed lever is permissive. The positive feeding operation is performed by a cyclically operable bail which also controls the tape sensing mechanism. The blocking lever, having been conditioned to block the tape feeding lever, cannot come into blocking relation until the bail has performed the positive tape feeding operation. When this operation has been performed the blocking lever moves into blocking relation to the tape feed lever, thereby preventing the permissive return of the tape feed lever when the bail moves away from that lever. The mechanism includes a latch for holding the blocking lever in the preparatory condition. A latch releasing lever is connected to the bail but is normally held out of position to engage the latch by the blocking lever itself. As the blocking lever moves into blocking position it conditions the latch releasing lever for engagement with the latch. However, the latch releasing lever will not release the latch until the next cyclic operation of the bail.

The bail, when next operated, releases the latch thereby causing the tape feed lever to be unblocked. The tape feed lever is not able to move far enough to pick up the next tooth in the tape feed ratchet before the bail, now in operation, engages it and moves it to the position in which it was blocked. Thus no tape feeding operation occurs in this cyclic operation of the bail and the tape feed lever will permissively pick up the next tooth on the feed ratchet only as the bail enters into its next cycle.

The cooperation between the manually operable member and the member which conditions the blocking lever to block the tape feed lever is of a single action character, so that even though the manually operable member is held in the operated condition, the latch will be released and the blocking lever will be restored to unblocking condition. Thus it is necessary to release and reoperate the manually operable member for each desired tape feed suppression, and suppression occurs only in single steps.

For a complete understanding of the invention reference may be had to the single figure of the drawing which shows in schematic form the receiving portion of a printing telegraph cipher system including a deciphering signal generator having a tape feed suppression mechanism in accordance with the present invention applied thereto.

Referring now to the drawing, the reference numeral 11 designates the face plate of a brush type distributor. A brush arm 12 carried by a shaft 13 has interconnected brushes 14 in conductive engagement with the segmented rings carried by the face plate. Shaft 13 is driven by motor 16 through friction clutch 17 and gears 18. Shaft 13 has secured thereto a stop disc 19 with which there cooperates a stop lever 21 controlled by electromagnet 22. When electromagnet 22 is energized lever 21 is withdrawn from blocking relation to disc 19 and shaft 13 is released for rotation.

Shaft 13 also has secured thereto a cam 23 which has a single apex. A lever 24 pivoted at 26 is held in engagement with cam 23 by tension spring 27. In the rest position of cam 23 lever 24 is held in the extreme counter-clockwise position as viewed from the upper end of pivot 26. At its foremost end the lever 24 is provided with an adjustable abutment screw 28 which is engaged by a depending arm 29 of a bail 31 pivoted at 32. A tension spring 33 holds arm 29 of bail 31 in engagement with abutment screw 28. In the rest condition of cam 23 lever 24 holds bail 31 in extreme counter-clockwise position as viewed from the foremost end of pivot 32.

Above the bail 31 a plurality of tape sensing levers 36 are pivotally supported on rod 37. At their right-hand ends the levers 36 are provided with tape sensing pins 38 and at their left-hand ends are bifurcated, and the bifurcations are entered by transmitter contact levers 39 which are pivoted on rod 41 and are insulated from each other. Intermediate their ends the tape sensing levers 36 are provided with depending arms 42 which terminate below the upper edge of bail 31. Tension springs 43 bias the tape sensing levers 36 in counter-clockwise direction to engage their depending arms 42 with the left-hand side of bail 31. With shaft 13 at rest bail 31 holds tape sensing levers 36 in extreme clockwise position.

Shaft 37 also pivotally supports a tape feed lever 43. This lever has a depending arm 44, similar to the depending arms of tape sensing levers 36, which engages bail 31 under the influence of biasing spring 46. At its free end the tape feed lever 43 pivotally supports a pawl 47 which is urged into engagement with a ratchet 48 by spring 49. Ratchet 48 is secured to a shaft 51 which also has secured to it a tape feed wheel 52 having radially extending pins engageable with feed perforations 50 in perforated tape 53 containing code perforations 55 which, in the case of a cipher signal generator associated with a receiving system, would be the deciphering core combinations.

Signals incoming over conductor 61, which may represent a telegraph line, or the output of a radio receiver, detector and amplifier, are applied to and operate receiving relay 62. This relay has its armature normally engaging the marking contact which is connected to the negative terminal of battery 63. A conductive path extends over conductors 64, 66, outer rest segment of the distributor, brushes 14 carried by distributor arm 12, inner rest segment of the distributor, conductor 67 and winding of start magnet 22 of the distributor to the negative terminal of battery 68. The batteries 63 and 68 being connected in opposition, the winding of electromagnet 22 is not energized and lever 21 is released to the position in which it holds distributor shaft disc 19 arrested. Upon response of receiving relay 62 to the start impulse of a code combination, which is of spacing nature, the armature moves to the spacing contact which is grounded, causing current to flow in the winding of electromagnet 22 which attracts lever 21, thereby disengaging the lever from distributor shaft disc 19 and permitting the shaft to rotate. As the brushes leave the rest segments they interrupt the energizing circuit of electromagnet 22 which releases. By the time this occurs the arresting shoulder on disc 19 has passed the end of lever 21 so that the lever cannot interfere with the rotation of disc 19 and the brushes continue to rotate. The inner ring of the distributor is continuous except for the rest segment and as soon as the inner brush leaves the rest segment it engages the continuous ring which is connected through the locking winding of receiving relay 62 to a potential divider which provides a potential at a value between negative battery and ground. Following departure from the rest segment the outer brush engages a short segment which is connected over conductor 71 and conductor 72 to a point 73 at which the path divides, one path extending through resistor 74, the other extending through the operating winding of relay 76, resistor 77, and resistor 78 to a point 79 at which these paths rejoin and continue over conductor 64, the armature of receiving relay 62 and the spacing contact of the relay to ground. With the path extended as described, to ground, relay 76, which is a mixing or deciphering relay, operates its armature to spacing, whereby ground is connected to the armature of that relay, through the locking winding of the relay, to a potential divider providing a potential between negative and ground and through the winding of a repeating relay 81 to a similar potential divider. Relay 81 has its marking contact connected to battery and its armature connected through the winding of an electromagnet 82 to ground. Electromagnet 82 represents the selector magnet of a teletypewriter printer which may be of the type shown in Patent 1,904,164 granted April 18, 1933 to S. Morton et al. and the disclosure of this patent is incorporated herein by reference as part of the present specification. With the armature of repeating relay 81 disengaged from its marking contact the circuit of selector magnet 82 of the teletypewriter printer is interrupted and the release of this electromagnet represents the start impulse of a telegraph code combination. As soon as the outer brush leaves the short segment it passes over a dead segment and in so doing interrupts the circuit through the operating winding of deciphering relay 76 and through the locking winding of receiving relay 62. Relay 62 is thus freed for response to the next received impulse but relay 76 is not disturbed because it remains locked to the spacing condition and holds repeating relay 81 in the spacing condition.

In addition to the short segment following the rest segment, five transmitting contacts 86, which are engaged by their respective contact levers 39 when those levers are rocked to extreme clockwise position under the influence of the tape sensing levers in rocking to their extreme counter-clockwise position to sense perforations in the tape, are connected over conductor 72 to the circuit branching point 73. Similarly, five other transmitting contacts 87 which are engaged by the transmitting contact levers 39 when those levers are in their counter-clockwise positions under the control of tape sensing levers which do not find perforations in the tape, are connected to a circuit branching point 75 from which a path is traced through resistor 78 and a parallel path is traced through resistor 77, the operating winding of relay 76 and resistor 74, these paths rejoining at the junction point 79. The five transmitting contact levers 39 are connected by five conductors 80 to five equally spaced short segments in the outer ring of the distributor and these segments represent the five significant impulses of a permutation code combination.

The manner in which relay 76 operates under the joint control of receiving relay 62 and the code combinations contained in tape 53 to derive the message signals, is fully described in the hereinbefore identified patent to K. E. Fitch and G. A. Locke and will not be repeated herein. It will be understood from the disclosure of that patent that during the reception by relay 62 of any ciphered code combination, if the tape sensing levers 36 are sensing the same code combination that was used in enciphering, the ciphered code will be correctly deciphered and the impulses representing the message signal will be repeated by relay 81 to the selector magnet 82 of the teletypewriter printer.

Shortly after shaft 13 is released for rotation in the manner hereinbefore described, the apex of cam 23 moves away from lever 24, the lever is rocked in clockwise direction by its spring 27, retracting the abutment screw 28 and permitting spring 33 to rock bail 31 in clockwise direction. With the bail rocked in this direction springs 43 rock tape sensing levers 36 in counter-clockwise direction to sense the code combination of perforations in the tape and spring 46 rocks tape feed lever 43 in counter-clockwise direction, moving pawl 47 upwardly to pick up the next tooth on ratchet 48. As shaft 13 nears completion of one revolution the apex of cam 23 again engages lever 24, restoring lever 24, bail 31, tape sensing levers 36 and tape feed lever 43 to the condition shown in the drawing. Tape feed lever 43, in being rocked to its extreme clockwise position, rotates ratchet 48 one step in the direction indicated by the arrow, thereby advancing the next combination of perforations in tape 53 to the tape sensing position.

Just before the brushes of the distributor reach the rest segment, the outer brush passes over a short segment which is connected over conductors 71 and 72 to the branching point 73. The speed of rotation of the distributor is such that receiving relay 62 is receiving the stop impulse at the end of the received code combination at the time that the brush passes over this short segment. Thus, a conductive path is extended from the locking winding of relay 62 to the same branching point as that described in connection with the reception of the start impulse. However, the armature of relay 62 is now engaging the marking contact due to reception of the stop impulse and thus the battery potential terminating the conductive path is reversed. This causes relay 76 to operate to marking if it had not already been operated to this condition prior to reception of the stop impulse, and the marking signal represented by this condition of relay 76 is repeated by relay 81 to the selector magnet 82 of the teletypewriter printer. As the brushes move on to the rest segment they reconnect electromagnet 22 to the armature of receiving relay 61. Since this relay is now in the marking condition there are like polarities at both ends of the circuit, electromagnet 22 remains released and lever 21 arrests distributor shaft disc 19. The distributor remains at rest until the armature of relay 62 again moves from its marking to its spacing contact.

If the next excursion of the armature of receiving relay 62 away from its marking contact is in response to the start impulse of a received code combination that code combination will be received and deciphered. If it should not be in response to the start impulse of a code combination but should be in response to a hit or line surge or static burst which momentarily operates relay 62 out of the marking condition, electromagnet 68 will be energized, distributor shaft 13 will be released for rotation and the distributor will execute at least one cycle of operation. At the end of this cycle tape 53 will be advanced one step and if no code combination is received during this cycle the distributor will stop at the end of the cycle and tape 53 will be one step ahead of the enciphering tape at the transmitting station. If a code combination is received while the distributor is partway through the erroneously started cycle, and code combinations continue to be received, it may be several cycles of the distributor before it is brought back into step with the received start and stop impulses and tape 53 may gain one or more additional steps on the enciphering tape at the transmitting station. With tape 53 out of step with the enciphering tape, code combinations thereafter received by relay 62 will not be correctly deciphered until tape 53 is brought back into step with the enciphering tape. Since tape 53 is ahead of the enciphering tape, it may be brought back into correct phase with the enciphering tape by suppressing one or more tape feeding operations.

Apparatus in accordance with the present invention for suppressing tape feeding operation includes a mounting plate 101 which is attached to a portion of the frame of the transmitter-distributor represented fragmentally at 102. Mounting plate 101 has secured thereto a bracket 103 provided with slots for guiding the shank 104 of a push-button 106 which projects outside the housing (not shown) of the transmitter-distributor mechanism. A spring 107 interconnects mounting plate 101 and the shank 104 of push-button 106 and exerts its pull on the shank 104 of push-button 106 in such direction that it not only retracts the push-button but holds it in engagement with the left-hand edges of its guide slots.

On its left-hand edge the shank of push-button 106 is provided with a cam projection 108, the purpose of which is to cause the shank 104 of the push-button, after it has been moved inwardly a predetermined distance by finger pressure on push-button 106, to move angularly so that its inner end moves rightwardly as the push-button continues to move inwardly. For this purpose a small amount of freedom is provided between the shank 104 of the push-button and its outer guide slot and considerably more lateral freedom is provided by the inner guide slot.

A leftwardly extending projection 115 at the inner end of push-button shank 104 engages a pin 109 carried by lever 110, pivoted at 111. A latching lever 112 for the lever 110 is pivoted at 113, and has a latching projection 114 disposed adjacent to the end of lever 110 which carries the pin 109. When push-button 106 is depressed, the laterally extending projection at the inner end of push-button shank 104, engaging pin 109, rocks lever 110 in clockwise direction and about the time that the end of lever 110 clears latching projection 114 and a spring 116 rocks the latching lever into latching relation to lever 110, cam projection 108 moves push-button shank 104 laterally and disengages the projection 115 at the inner end of the shank from pin 109. If push-button 106 is then released spring 107 will restore it to its initial condition, lever 110 remaining latched. If push-button 106 is held in the operated condition the laterally extending projection at its inner end will be disposed rightwardly and out of cooperation with pin 109.

The arm of lever 110 which is disposed on the opposite side of pivot 111 from that which carries pin 109 is provided with a spring post 117 from which a tension spring 118 extends to a spring post 119 secured to mounting plate 101. Spring post 117 also has connected thereto one end of a tension spring 120 the other end of which is connected to a tape feed blocking lever 121 also pivoted at 111. Lever 121 is provided at its left-hand end as viewed in the drawings with a shoulder 122 which is adapted to block depending arm 44 of tape feed lever 43 under circumstances which will be described hereinafter. Lever 121 is also provided with a downwardly extending abutment 123 which is held against the right-hand edge of the rearwardly extending arm of lever 110 by spring 120.

Bail 31 has attached thereto a bracket 124 to which is pivotally connected an unlatching bar 126 for the latching lever 112. Blocking lever 121 is provided with a laterally extending arm 127 presented toward unlatching bar 126 and a spring 130 connected between bracket 124 and unlatching bar 126 holds the unlatching bar in engagement with the free end of arm 127 of tape feed blocking lever 121. A bracket 128 secured to mounting plate 101 serves as a guide for the outer edge of unlatching bar 126 and the bracket 128 has a portion overlying unlatching bar 126 to hold the unlatching bar substantially in slidable engagement with mounting plate 101. There must be sufficient freedom in the pivotal connection between unlatching bar 126 and bracket 124 carried by bail 31 to permit unlatching bar 126 to slide in a plane parallel to the plane of mounting plate 101 as bail 31 rocks on its pivot 32. Bracket 128 determines the extreme clockwise angular position of unlatching bar 126 in its plane of movement. Laterally extending arm 127 of tape feed blocking lever 121, being in engagement with unlatching bar 126, determines the extreme counter-clockwise position of blocking lever 121. Abutment 123 of blocking lever 121 determines the extreme counter-clockwise position of lever 110 and spring 118, being connected to lever 110, urges all of these elements into the extreme positions. In this condition of the apparatus a hook portion 129 of unlatching bar 126 is held clear of the free end of latching lever 112. When the cipher signal generator is in operation to decipher incoming signals and push-button 106 is unoperated unlatching bar 126 will slide back and forth in engagement with bracket 128 and without engaging its hook portion 129 with latching lever 112. In this condition of the apparatus tape feed blocking lever 121 is held clear of the depending arm 44 of tape feed lever 43 and this lever operates normally under the control of bail 31.

Consideration will first be given to the sequence of operations resulting from the depression of push-button 106 at a time when the cipher signal generator is idle. For example, if signals are not being received but an attendant hears or observes that the receiving teletypewriter has executed an operating cycle, he will know that receiving relay 62 has responded to some extraneous condition simulating a start impulse and that the deciphering signal generator has executed one cycle concurrently with the receiving teletypewriter, thereby causing the tape 53 to be one step ahead of the key tape at the transmitting station. In order to initiate a tape feed suppression operation for the purpose of bringing tape 53 back into phase with the key tape at the transmitting station, the attendant operates push-button 106. Shank 104 of the push-button rocks lever 110 in clockwise direction and before the push-button shank becomes disengaged from pin 109 due to the lateral camming of the push-button shank by cam projection 108 the foremost end of lever 110 clears the latching projection 114 of latching lever 112 and this lever is drawn into latching relation to lever 110. Lever 110 in rocking in clockwise direction rocks blocking lever 121 in clockwise direction due to the interconnection between the two levers afforded by spring 120. Because the cipher signal generator is assumed to be in the rest condition, bail 31 is at or near its extreme counter-clockwise position, tape feed lever 43 is near its extreme clockwise position and the blocking shoulder 122 on blocking lever 121 moves immediately into blocking relation to depending arm 44 of tape feed lever 43. With lever 121 thus rocked clockwise the free end of its laterally extending arm 127 is drawn away from unlatching bar 126, permitting that bar to rock in counter-clockwise direction about its pivotal mounting on bracket 124, and under the influence of spring 130 until its hook portion 129 engages the free end of latching lever 112. When push-button 106 is released it returns to its normal condition without in any way disturbing the latched condition of lever 110.

Nothing further will happen until, in response to a received signal combination or to another line disturbance or atmospheric disturbance simulating a start impulse, another cycle of the distributor ensues. At the beginning of such cycle, cam 23 permits bail 31 to rock to its extreme clockwise position but the depending arm 44 of tape feed lever 43 is prevented from following the bail due to the blocking action of lever 121 and tape feed lever 43 does not rock in counter-clockwise direction to pick up the next tooth on ratchet 48. Unlatching bar 126 moves rightwardly as viewed in the drawing, as bail 31 rocks to its extreme clockwise position and before the bar 126 reaches its limit of movement its hook portion 129 escapes from the free end of lever 112 and engages the right edge of that lever, spring 130 rocking bar 126 into operative engagement with latching lever 112.

As the distributor approaches completion of its cycle cam 23 restores bail 31 to near its extreme counter-clockwise position. Unlatching bar 126 moves leftwardly with bail 31 and in so doing rocks latching lever 112 in clockwise direction, releasing lever 110 from latching projection 114. Spring 118 immediately rocks lever 110 in counter-clockwise direction, lever 110 imparts counter-clockwise movement to lever 121 through abutment 123, thus withdrawing lever 121 from blocking relation to tape feed lever 43, and the laterally extending arm 127 of lever 121 rocks unlatching bar 126 in clockwise direction, moving it out of operative relation to latching lever 112, these various movements being arrested when bar 126 reaches the limit of its clockwise movement established by bracket 128. In this way the feeding of the tape one step at the end of the cycle of the distributor has been prevented and in the next cycle the tape sensing levers 36 will sense the same code combination in tape 53 that they sensed in the previous cycle. If the cycle of the distributor just described has also resulted from a disturbance in the communication channel and the attendant is aware of it, he may again operate push-button 106, thereby to cause the feeding of tape to be suppressed at the end of the next cycle of the distributor at such time as that next cycle occurs.

As previously set forth, a disturbance on the communication channel may occur while message reception is in progress and cause tape 53 to gain one step on the key tape at the transmitting station. The material thereafter recorded will be unintelligible until the necessary correction is made. If the reception of the message is being closely supervised, the attendant may operate push-button 106 almost as soon as the out-of-phase condition of the tape occurs, because the recording of two or three characters which do not fit the preceding portion of the message and do not make sense is sufficient to indicate the out-of-phase condition of the tape. The distributor may be at any point in its cycle at the time push-button 106 is operated and for the purposes of this description it will be assumed that cam 23 has previously released bail 31 to its extreme clockwise position. As before, lever 110 is rocked in clockwise direction by push-button 106 and becomes latched by lever 112. Blocking lever 121 starts to follow the movement of lever 110 but blocking shoulder 122 of lever 121 is so located that it can move into blocking relation to depending arm 44 of tape feed lever 43 only when that lever is in substantially the extreme clockwise position. Since the tape feed lever would be in the extreme counter-clockwise position at this time, having followed bail 31 and picked up the next tooth on ratchet 43, lever 121 can move clockwise only until it engages the face of depending arm 44 of tape feed lever 43. This engagement arrests lever 121 while lever 110 continues to its latched position under the operative influence of push-button 106, spring 119 yielding to accommodate the full movement of lever 110. With bail 31 in the extreme clockwise position the hook portion 129 of unlatching bar 126 is disposed to the right of the free end of latching lever 112 but the small amount of movement that the depending arm 44 of tape feed lever 43 has permitted to blocking lever 121 in turn limits the counter-clockwise movement permitted to unlatching bar 126 by projection 127 of lever 121 and this movement is insufficient to bring the hook portion 129 of bar 126 into operative relation to latch lever 112. Accordingly, a condition preparatory to the blocking of tape feed lever 43 is stored in spring 120.

As the distributor approaches completion of its cycle cam 23 restores bail 31 to extreme counter-clockwise position. Bar 126 is retracted by bail 31 without engaging and releasing latch lever 112. Tape feed lever 43 is rocked in clockwise direction by bail 31, thus advancing ratchet 48 one step and advancing the next code combination in tape 53 to the sensing position. As tape feed lever 43 approaches its extreme clockwise position its depending arm 44 moves to the right of blocking shoulder 122 on lever 121 and when this occurs the energy stored in spring 119 rocks lever 121 into full blocking relation to depending arm 44 of tape feed lever 43. In so doing, lever 121 withdraws the end of its laterally extending arm 127 away from unlatching bar 126, preparing that bar to engage and release latch 112. Assuming that another receiving cycle ensues immediately, bail 31 will rock to extreme clockwise position bringing unlatching bar 126 into operative relation to latching lever 112. Tape feed lever 43 is held by blocking lever 121 and is prevented from picking up the next tooth. The code combination just previously brought to the sensing position will be sensed by tape sensing levers 36 and the impulses represented thereby will interact with the impulses of the received code combination. This received code combination will not be correctly deciphered because the code combination in the key tape 53 is now being sensed for the first time. As the distributor completes its cycle bail 31 is returned to its extreme counter-clockwise position. This movement ordinarily is used to perform the tape feeding operation but since the tape feed lever has been blocked and held from picking up the next tooth in the ratchet 48, the tape is not advanced. The return of bail 31 to its extreme counter-clockwise position results in the release of latch 112 through the operation of releasing bar 126 and the tape feed suppression mechanism is restored to normal condition. In the next receiving cycle of the distributor the impulses of the same code combination in key tape 53 interact with the received impulses. Since the key tape has not advanced whereas the key tape at the transmitting station presumably has advanced, the two key tapes should now be in phase and the code combination should be correctly deciphered.

If the teletypewriter continues to print unintelligible material it will probably be a result of the gaining by tape 53 of two or more steps on the key tape at the transmitting station. Accordingly, the attendant will again operate push-button 106 to suppress feeding of the tape by one step relative to the cycles of the distributor and if this does not produce intelligible copy he may operate push-button 106 still another time. In all likelihood the tape 53 will not gain more than one or two steps on the tape at the transmitting station and only a few operations of push-button 106 will be required to effect the necessary correction. Because of the non-repeat characteristic of push-button 106 afforded by its cam projection 108, feeding of tape 53 will be suppressed for only one cycle of the distributor for each separate operation of push-button 106 regardless of how long the attendant holds the push-button operated. In this way rephasing of the tape by single corrective steps is achieved.

Although a particular embodiment of the invention has been disclosed in the drawing and described in the foregoing specification it will be understood that the invention is not limited to such specific embodiment but is capable of modification and rearrangement without departing from the spirit of the invention and within the scope of the appended claims.

What is claimed is:

1. In a tape-controlled telegraph transmitter, a distributor, a tape sensing mechanism, a tape feeding mechanism, means for blocking said tape feeding mechanism, manually operable means for operating said blocking means, means for latching said blocking means in its blocking condition, and means controlled by said distributor for releasing said latching means.

2. In a tape-controlled telegraph transmitter, a distributor, a tape sensing mechanism, a tape feeding mechanism, means for blocking said tape feeding mechanism, manually operable means for operating said blocking means, means for latching said blocking means in its blocking condition, and means for precluding reoperation of said blocking means except after restoration of said manually operable means to normal.

3. In a tape-controlled telegraph transmitter, a distributor, a tape sensing mechanism, a tape feeding mechanism, means for blocking said tape feeding mechanism, manually operable means for activating said blocking means, means controlled by said distributor for deactivating said blocking means, and means for precluding reactivation of said blocking means except by restoration and reoperation of said manually operable means.

4. In a tape-controlled telegraph transmitter, a distributor, a tape sensing mechanism, a tape feeding mechanism, a bail operable by said distributor for operating said tape sensing and tape feeding mechanisms, means for blocking said tape feeding mechanism, manually operable means for activating said blocking means, means operable by said bail for deactivating said blocking means, and means for precluding reactivation of said blocking means except by restoration and reoperation of said manually operable means.

EDWARD F. WATSON.

REFERENCES CITED

The following references are of record in the file of this patent:

UNITED STATES PATENTS

| Number | Name | Date |
|---|---|---|
| 2,401,454 | Bemis | June 4, 1946 |
| 2,472,701 | Goetz | June 7, 1949 |